(12) United States Patent
Li et al.

(10) Patent No.: US 10,579,703 B2
(45) Date of Patent: Mar. 3, 2020

(54) SIMILARITY MEASUREMENT METHOD AND DEVICE

(71) Applicant: HUAWEI TECHNOLOGIES CO., LTD., Shenzhen, Guangdong (CN)

(72) Inventors: Zhenguo Li, Hong Kong (CN); Jiefeng Cheng, Shenzhen (CN); Wei Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 15/694,559

(22) Filed: Sep. 1, 2017

(65) Prior Publication Data

US 2017/0364478 A1 Dec. 21, 2017

Related U.S. Application Data

(63) Continuation of application No. PCT/CN2016/074728, filed on Feb. 26, 2016.

(30) Foreign Application Priority Data

Mar. 3, 2015 (CN) .......................... 2015 1 0093574

(51) Int. Cl.
*G06F 17/12* (2006.01)
*G06F 16/951* (2019.01)
(Continued)

(52) U.S. Cl.
CPC ................ *G06F 17/12* (2013.01); *G06F 7/00* (2013.01); *G06F 16/903* (2019.01);
(Continued)

(58) Field of Classification Search
CPC .... G06F 7/02–023; G06F 17/12; G06F 17/16; G06F 16/951
See application file for complete search history.

(56) References Cited

U.S. PATENT DOCUMENTS 8,311,950 B1 * 11/2012 Kunal ................ G06Q 30/0201
705/319
8,582,554 B2 11/2013 Aggarwal
(Continued)

FOREIGN PATENT DOCUMENTS

CN 101576903 A 11/2009
CN 101894123 A 11/2010
(Continued)

OTHER PUBLICATIONS

Wu Dan-yu. The comparison between Jacobi Iteration and Gauss2Seidel Iteration, Journal of Zhongkai University of Agriculture and Technology,18 (3) , Dec. 31, 2005. total 5 pages.
(Continued)

*Primary Examiner* — Matthew D Sandifer
(74) *Attorney, Agent, or Firm* — Leydig, Voit & Mayer, Ltd.

(57) ABSTRACT

A similarity measurement method includes: obtaining a directional relationship between nodes in a network, and determining a transition matrix; calculating a constraint matrix according to the transition matrix and an obtained attenuation factor; constructing a system of linear equations, where a coefficient matrix of the system of linear equations is the constraint matrix, and a variable of the system of linear equations is a correction vector; solving the system of linear equations by means of iteration by using a Jacobi method, and determining the correction vector; and calculating similarities between the nodes according to the transition matrix, the attenuation factor, and a diagonal correction matrix that is generated according to the correction vector. In the method, the correction vector is determined by using the Jacobi method, and further the similarities between the nodes may be calculated.

20 Claims, 3 Drawing Sheets

(51) Int. Cl.
  *G06F 7/00* (2006.01)
  *G06F 17/16* (2006.01)
  *G06F 17/10* (2006.01)
  *G06F 16/903* (2019.01)
  *G06F 7/02* (2006.01)
  *G06Q 30/02* (2012.01)

(52) U.S. Cl.
  CPC ............ *G06F 16/951* (2019.01); *G06F 17/10* (2013.01); *G06F 17/16* (2013.01); *G06Q 30/02* (2013.01); *G06F 7/02* (2013.01)

(56) References Cited

U.S. PATENT DOCUMENTS

| | | | |
|---|---|---|---|
| 10,115,115 B2* | 10/2018 | Werneck | G06F 17/30964 |
| 2009/0262664 A1 | 10/2009 | Leighton et al. | |
| 2011/0268364 A1* | 11/2011 | Hido | G06F 17/30958 382/218 |
| 2013/0185294 A1 | 7/2013 | Kami | |
| 2013/0346386 A1 | 12/2013 | Zandona et al. | |

FOREIGN PATENT DOCUMENTS

| | | |
|---|---|---|
| CN | 103177414 A | 6/2013 |
| CN | 103412872 A | 11/2013 |
| CN | 104361062 A | 2/2015 |
| JP | 2013196201 A | 9/2013 |

OTHER PUBLICATIONS

Takanori Maehara et al. Efficient SimRank Computation via Linearization, arXiv:1411.7228v1, Nov. 26, 2014. total 46 pages.

Dmitry Lizorkin et al:"Accuracy estimate and optimization techniques for SimRank computation", VLDB Journal, Springer Uerlag Berlin, DE, vol .19, No. 1, Feb. 1, 2010, XP058119438, 22 pages.

Weiren Yu et al:"A space and time efficient algorithm for SimRank computation", World Wide Web;Internet and Web Information Systems, Kluwer Academic Publishers, DO, vol .15, No. 3, Dec. 7, 2010, XP035017587, 28 pages.

David Gleich et al:"Fast Parallel PageRank:A Linear System Approach", Jan. 1, 2004, XP055450186, 8 pages.

* cited by examiner

FIG. 4

SIMILARITY MEASUREMENT METHOD AND DEVICE

CROSS-REFERENCE TO RELATED APPLICATIONS

This application is a continuation of International Application No. PCT/CN2016/074728, filed on Feb. 26, 2016, which claims priority to Chinese Patent Application No. 201510093574.2, filed on Mar. 3, 2015. The disclosures of the aforementioned applications are hereby incorporated by reference in their entireties.

TECHNICAL FIELD

Embodiments of the present application relate to the field of data processing, and more specifically, to a similarity measurement method and device.

BACKGROUND

Nowadays, in the era of big data Internet, large graphs and large networks, such as a social network, the Internet, e-commerce, and a communications network, are common representation manners of data and information. A graph-based application may include a search and a recommendation. The search may be, for example, a Google search engine. The recommendation may be, for example, a friend recommendation from Facebook, a vocation recommendation from LinkedIn (LinkedIn), a film recommendation from Netflix, product recommendations from Ebay and Amazon, or a message recommendation from Twitter. Generally, a search and a recommendation are both performed based on a similarity between nodes in a graph.

For example, a social network is an important platform for sharing information between friends. More friends indicate more frequent information sharing and communication. Therefore, an important function for social network maintenance is to carry out a friend recommendation according to a similarity between nodes.

For another example, in a churn analysis of Huawei, assuming that a customer A shifts from a service of China Unicom to a service of China Mobile, China Unicom needs to understand a customer most "similar" to the customer A, consider the customer as a customer that may potentially be churned, and focus on the customer.

A method for measuring a similarity between nodes is: collecting various attributes, such as age, occupation, income, and hobbies, of all nodes, and then measuring a similarity between the nodes according to similarities between the various attributes. However, in such a method, not only a large number of customer information needs to be collected, a high requirement is imposed on storage, but also such a method may involve personal privacy information of a customer.

Another method for effectively measuring a similarity between nodes is SimRank. Currently, SimRank has been widely applied to various scenarios, for example, a recommendation system, information search, link prediction, a citation network, and a student course network. However, in a SimRank-based similarity measurement method in the prior art, calculation is directly performed according to a definition. Consequently, time complexity and space complexity are high, and the method is not applicable to a large network.

SUMMARY

Embodiments of the present application provide a similarity measurement method in which time complexity and space complexity are low and that is applicable to a large network.

According to a first aspect, a similarity measurement method is provided, including:

obtaining a directional relationship between every two of n nodes in a network, and determining a transition matrix according to the directional relationships, where a dimension of the transition matrix is n×n, and n is a positive integer greater than or equal to 2;

obtaining an attenuation factor, and calculating a constraint matrix according to the transition matrix and the attenuation factor, where the attenuation factor is an attenuation factor defined in a SimRank similarity method, and a dimension of the constraint matrix is n×n;

constructing a system of linear equations according to the constraint matrix, where a coefficient matrix of the system of linear equations is the constraint matrix, and a variable of the system of linear equations is a correction vector;

solving the system of linear equations by means of iteration by using a Jacobi Jacobi method, and determining the correction vector;

generating a diagonal correction matrix according to the correction vector, where a diagonal element of the diagonal correction matrix is a component of the correction vector, and a dimension of the diagonal correction matrix is n×n; and calculating similarities between the n nodes according to the transition matrix, the attenuation factor, and the diagonal correction matrix.

With reference to the first aspect, in a first possible implementation of the first aspect, the solving the system of linear equations by means of iteration by using a Jacobi method, and determining the correction vector includes:

solving the system of linear equations by means of iteration by using the Jacobi method, and determining a solution, which is obtained when a convergence condition is met, as the correction vector, or determining a solution, which is obtained when a preset maximum number of times of iteration is reached, as the correction vector.

With reference to the first aspect or the first possible implementation of the first aspect, in a second possible implementation of the first aspect, the constraint matrix is represented by A, the correction vector is represented by x, and the system of linear equations is represented by Ax=b, where b is a vector whose each element is 1.

With reference to the second possible implementation of the first aspect, in a third possible implementation of the first aspect, the solving the system of linear equations by means of iteration by using a Jacobi method, and determining the correction vector includes:

calculating the correction vector by using $$x_i^{(k)} = \frac{1}{a_{ii}}\left(b_i - \sum_{j \neq i} a_{ij} x_j^{(k-1)}\right),$$

where $x_i$ represents an $i^{th}$ element of the correction vector x, $x_j$ represents a $j^{th}$ element of the correction vector x, $a_{ij}$ represents an element in an $i^{th}$ row and in a $j^{th}$ column of the constraint matrix A, $a_{ii}$ represents an element in the $i^{th}$ row and in an $i^{th}$ column of the constraint matrix A, $b_i=1$, k represents a number of times of iteration of the Jacobi method, i, j=1, 2, . . . , n, and k is a positive integer.

With reference to any one of the first aspect or the possible implementations of the first aspect, in a fourth possible implementation of the first aspect, the attenuation factor is represented by c, the transition matrix is represented by P, the constraint matrix is represented by A, and the calculating a constraint matrix according to the transition matrix and the attenuation factor includes:

determining that an element of the constraint matrix A is $a_{ij}=e_i\Box e_j+cPe_i\Box Pe_j+ \ldots +c^tP^te_i\Box P^te_j$, where $e_i$ and $e_j$ are orthogonal unit vectors, and t is a preset positive integer.

With reference to any one of the first aspect or the possible implementations of the first aspect, in a fifth possible implementation of the first aspect, the correction vector is represented by x, the diagonal correction matrix is represented by D, and the generating a diagonal correction matrix according to the correction vector includes:

determining that an element $D_{ij}$ of the diagonal correction matrix D is:

$$D_{ij} = \begin{cases} x_i, & i = j \\ 0, & i \neq j \end{cases},$$

where $D_{ij}$ represents an element in an $i^{th}$ row and in $j^{th}$ column of the diagonal correction matrix D, and $x_i$ represents the $i^{th}$ element of the correction vector x, where i, j=1, 2, . . . , n.

With reference to any one of the first aspect or the possible implementations of the first aspect, in a sixth possible implementation of the first aspect, the attenuation factor is represented by c, the transition matrix is represented by P, the diagonal correction matrix is represented by D, the similarities between the nodes are represented by S, and the calculating similarities between the n nodes according to the transition matrix, the attenuation factor, and the diagonal correction matrix includes:

calculating the similarities between the n nodes according to the following formula:

$S=D+cP^TDP+c^2(P^T)^2DP^2+ \ldots +c^t(P^T)^tDP^t$, where

T represents transposition, t is a preset positive integer, and an element $s_{ij}$ that is in an $i^{th}$ row and in a $j^{th}$ column of a matrix represented by S represents a similarity between an $i^{th}$ node and a $j^{th}$ node.

With reference to any one of the first aspect or the possible implementations of the first aspect, in a seventh possible implementation of the first aspect, the obtaining a directional relationship between every two of n nodes in a network, and determining a transition matrix according to the directional relationships includes:

constructing a graph according to the directional relationship between every two of the n nodes in the network, where the n nodes compose n nodes in the graph, and the directional relationship composes a directed edge between the nodes in the graph; and using a first-order transition matrix in a reversal graph of the graph as the transition matrix.

With reference to any one of the first aspect or the possible implementations of the first aspect, in an eighth possible implementation of the first aspect, the transition matrix is represented by P, and $$P_{ij} = \begin{cases} 1/|\text{In}(j)|, & (i, j) \in E \\ 0, & (i, j) \notin E \end{cases},$$

$P_{ij}$ represents an element in an $i^{th}$ row and in a $j^{th}$ column of the transition matrix P, In(j) represents a set of nodes that are all directed to a node j, and E represents a set of node groups in which there is a directional relationship between nodes in the node groups.

According to a second aspect, a similarity measurement device is provided, including:

an obtaining unit, configured to: obtain a directional relationship between every two of n nodes in a network, and obtain an attenuation factor, where the attenuation factor is an attenuation factor defined in a SimRank similarity method, and n is a positive integer greater than or equal to 2; and a processing unit, configured to: determine a transition matrix according to the directional relationships obtained by the obtaining unit, and calculate a constraint matrix according to the transition matrix and the attenuation factor that is obtained by the obtaining unit, where a dimension of the transition matrix is n×n, and a dimension of the constraint matrix is n×n, where the processing unit is further configured to construct a system of linear equations according to the constraint matrix, where a coefficient matrix of the system of linear equations is the constraint matrix, and a variable of the system of linear equations is a correction vector;

the processing unit is further configured to: solve the system of linear equations by means of iteration by using a Jacobi Jacobi method, and determine the correction vector;

the processing unit is further configured to generate a diagonal correction matrix according to the correction vector, where a diagonal element of the diagonal correction matrix is a component of the correction vector, and a dimension of the diagonal correction matrix is n×n; and the processing unit is further configured to calculate similarities between the n nodes according to the transition matrix, the diagonal correction matrix, and the attenuation factor that is obtained by the obtaining unit.

With reference to the second aspect, in a first possible implementation of the second aspect, the processing unit is specifically configured to:

solve the system of linear equations by means of iteration by using the Jacobi method, and determine a solution, which is obtained when a convergence condition is met, as the correction vector, or determine a solution, which is obtained when a preset maximum number of times of iteration is reached, as the correction vector.

With reference to the second aspect or the first possible implementation of the second aspect, in a second possible implementation of the second aspect, the constraint matrix is represented by A, the correction vector is represented by x, and the system of linear equations is represented by Ax=b, where b is a vector whose each element is 1.

With reference to the second possible implementation of the second aspect, in a third possible implementation of the second aspect, the processing unit is specifically configured to:

calculate the correction vector by using $$x_i^{(k)} = \frac{1}{a_{ii}}\left(b_i - \sum_{j \neq i} a_{ij} x_j^{(k-1)}\right),$$

where $x_i$ represents an $i^{th}$ element of the correction vector x, $x_j$ represents a $j^{th}$ element of the correction vector x, $a_{ij}$ represents an element in an $i^{th}$ row and in a $j^{th}$ column of the constraint matrix A, $a_{ii}$ represents an element in the $i^{th}$ row and in an $i^{th}$ column of the constraint matrix A, $b_i$=1, k represents a number of times of iteration of the Jacobi method, i, j=1, 2, ..., n and k is a positive integer.

With reference to any one of the second aspect or the possible implementations of the second aspect, in a fourth possible implementation of the second aspect, the attenuation factor is represented by c, the transition matrix is represented by P, the constraint matrix is represented by A, and the processing unit is specifically configured to:

determine that an element of the constraint matrix A is $a_{ij}=e_i\Box e_j+cPe_i\Box Pe_j+\ldots+c^tP^te_i\Box P^te_j$, where $e_i$ and $e_j$ are orthogonal unit vectors, and t is a preset positive integer.

With reference to any one of the second aspect or the possible implementations of the second aspect, in a fifth possible implementation of the second aspect, the correction vector is represented by x, the diagonal correction matrix is represented by D, and the processing unit is specifically configured to:

determine that an element $D_{ij}$ of the diagonal correction matrix D is:

$$D_{ij} = \begin{cases} x_i, & i = j \\ 0, & i \neq j \end{cases},$$

where $D_{ij}$ represents an element in an $i^{th}$ row and in $j^{th}$ column of the diagonal correction matrix D, and $x_i$ represents the $i^{th}$ element of the correction vector x, where i, j=1, 2, ..., n.

With reference to any one of the second aspect or the possible implementations of the second aspect, in a sixth possible implementation of the second aspect, the attenuation factor is represented by c, the transition matrix is represented by P, the diagonal correction matrix is represented by D, the similarities between the n nodes are represented by S, and the processing unit is specifically configured to:

calculate the similarities between the nodes according to the following formula:

$$S = D + cP^TDP + c^2(P^T)^2DP^2 + \ldots + c^t(P^T)^tDP^t, \text{ where}$$

T represents transposition, t is a preset positive integer, and an element $s_{ij}$ that is in an $i^{th}$ row and in a $j^{th}$ column of a matrix represented by S represents a similarity between an $i^{th}$ node and a $j^{th}$ node.

With reference to any one of the second aspect or the possible implementations of the second aspect, in a seventh possible implementation of the second aspect, the processing unit is specifically configured to:

construct a graph according to the directional relationship that is between every two of the n nodes in the network and that is obtained by the obtaining unit, where the n nodes compose n nodes in the graph, and the directional relationship composes a directed edge between the nodes in the graph; and use a first-order transition matrix in a reversal graph of the graph as the transition matrix.

With reference to any one of the second aspect or the possible implementations of the second aspect, in an eighth possible implementation of the second aspect, the transition matrix is represented by P, and $$P_{ij} = \begin{cases} 1/|\text{In}(j)|, & (i, j) \in E \\ 0, & (i, j) \notin E \end{cases},$$

where $P_{ij}$ represents an element in an $i^{th}$ row and in a $j^{th}$ column of the transition matrix P, In(j) represents a set of nodes that are all directed to a node j, and E represents a set of node groups in which there is a directional relationship between nodes in the node groups.

According to a third aspect, a similarity measurement device is provided, including:

a receiver, configured to: obtain a directional relationship between every two of n nodes in a network, and obtain an attenuation factor, where the attenuation factor is an attenuation factor defined in a SimRank similarity method, and n is a positive integer greater than or equal to 2; and a processor, configured to: determine a transition matrix according to the directional relationships obtained by the receiver, and calculate a constraint matrix according to the transition matrix and the attenuation factor that is obtained by the receiver, where a dimension of the transition matrix is n×n, and a dimension of the constraint matrix is n×n, where the processor is further configured to construct a system of linear equations according to the constraint matrix, where a coefficient matrix of the system of linear equations is the constraint matrix, and a variable of the system of linear equations is a correction vector; the processor is further configured to: solve the system of linear equations by means of iteration by using a Jacobi Jacobi method, and determine the correction vector;

the processor is further configured to generate a diagonal correction matrix according to the correction vector, where a diagonal element of the diagonal correction matrix is a component of the correction vector, and a dimension of the diagonal correction matrix is n×n; and the processor is further configured to calculate similarities between the n nodes according to the transition matrix, the diagonal correction matrix, and the attenuation factor that is obtained by the receiver.

With reference to the third aspect, in a first possible implementation of the third aspect, the processor is specifically configured to:

solve the system of linear equations by means of iteration by using the Jacobi method, and determine a solution, which is obtained when a convergence condition is met, as the correction vector, or determine a solution, which is obtained when a preset maximum number of times of iteration is reached, as the correction vector.

With reference to the third aspect or the first possible implementation of the third aspect, in a second possible implementation of the third aspect, the constraint matrix is represented by A, the correction vector is represented by x, and the system of linear equations is represented by Ax=b, where b is a vector whose each element is 1.

With reference to the first possible implementation of the third aspect, in a third possible implementation of the third aspect, the processor is specifically configured to:

calculate the correction vector by using $$x_i^{(k)} = \frac{1}{a_{ii}}\left(b_i - \sum_{j \neq i} a_{ij} x_j^{(k-1)}\right),$$

where $x_i$ represents an $i^{th}$ element of the correction vector x, $x_j$ represents a $j^{th}$ element of the correction vector x, $a_{ij}$ represents an element in an $i^{th}$ row and in $j^{th}$ column of the constraint matrix A, $a_{ii}$ represents an element in the $i^{th}$ row and in an $i^{th}$ column of the constraint matrix A, $b_i$=1, k represents a number of times of iteration of the Jacobi method, i, j=1, 2, . . . , n and k is a positive integer.

With reference to any one of the third aspect or the possible implementations of the third aspect, in a fourth possible implementation of the third aspect, the attenuation factor is represented by c, the transition matrix is represented by P, the constraint matrix is represented by A, and the processor is specifically configured to:

determine that an element of the constraint matrix A is $a_{ij}=e_i\square e_j+cPe_i\square Pe_j+ \ldots +c^tP^te_i\square P^te_j$, where $e_i$ and $e_j$ are orthogonal unit vectors, and t is a preset positive integer.

With reference to any one of the third aspect or the possible implementations of the third aspect, in a fifth possible implementation of the third aspect, the correction vector is represented by x, the diagonal correction matrix is represented by D, and the processor is specifically configured to:

determine that an element $D_{ii}$ of the diagonal correction matrix D is:

$$D_{ij} = \begin{cases} x_i, & i = j \\ 0, & i \neq j \end{cases},$$

where $D_{ij}$ represents an element in an $i^{th}$ row and in $j^{th}$ column of the diagonal correction matrix D, and $x_i$ represents the $j^{th}$ element of the correction vector x, where i, j=1, 2, . . . , n.

With reference to any one of the third aspect or the possible implementations of the third aspect, in a sixth possible implementation of the third aspect, the attenuation factor is represented by c, the transition matrix is represented by P, the diagonal correction matrix is represented by D, the similarities between the n nodes are represented by S, and the processor is specifically configured to:

calculate the similarities between the nodes according to the following formula:

$S=D+cP^TDP+c^2(P^T)^2DP^2+ \ldots +c^t(P^T)^tDP^t$, where

T represents transposition, t is a preset positive integer, and an element $s_{ij}$ that is in an $i^{th}$ row and in a $j^{th}$ column of a matrix represented by S represents a similarity between an $i^{th}$ node and a $j^{th}$ node.

With reference to any one of the third aspect or the possible implementations of the third aspect, in a seventh possible implementation of the third aspect, the processor is specifically configured to:

construct a graph according to the obtained directional relationship that is between every two of the n nodes in the network, where the n nodes compose n nodes in the graph, and the directional relationship composes a directed edge between the nodes in the graph; and use a first-order transition matrix in a reversal graph of the graph as the transition matrix.

With reference to any one of the third aspect or the possible implementations of the third aspect, in an eighth possible implementation of the third aspect, the transition matrix is represented by P, and $$P_{ij} = \begin{cases} 1/|\text{In}(j)|, & (i, j) \in E \\ 0, & (i, j) \notin E \end{cases},$$

where $P_{ij}$ represents an element in an $i^{th}$ row and in a $j^{th}$ column of the transition matrix P, In(j) represents a set of nodes that are all directed to a node j, and E represents a set of node groups in which there is a directional relationship between nodes in the node groups.

In the embodiments of the present application, the correction vector is determined by using the Jacobi method, and further the similarities between the nodes may be calculated. In each time of iteration of the Jacobi method, elements for calculating the correction vector are independent of each other. In this way, concurrent calculation can be performed, so that a calculation time can be effectively reduced by using a computer cluster, time complexity and space complexity during calculation can be reduced, and the embodiments of the present application are applicable to a large network.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

SimRank is a model for measuring a similarity between any two nodes based on topology structure information of a graph.

In a graph G=(V,E), V is a vertex set and represents a set of nodes in the graph; and E is an arc set and represents a set of node groups in which there is a directional relationship between nodes in the node groups. That is, E is a subset of V×V.

In(i) is used to represent a set of nodes that are all directed to a node i (that is, an in-neighbor set), and s(i,j) is used to represent a SimRank similarity between two nodes i and j. Therefore, a mathematical definition of SimRank may be expressed as follows:
1. s(i,j)=0 if In(i)=∅ or In(j)=∅.
2. In another case, $$s(i, j) = \begin{cases} 1, & i = j \\ \frac{c}{|In(i)||In(j)|} \sum_{i' \in In(i), j' \in In(j)} s(i', j'), & i \neq j \end{cases} \quad (1)$$

where c∈(0,1) is an attenuation factor, and ∅ represents an empty set.

It can be seen from the definition that in SimRank similarity measurement, a node has a highest similarity to the node itself, and the similarity is 1. A similarity between two nodes is multiplying an average value of similarities between nodes that are directed to the two nodes by the attenuation factor.

According to the foregoing definition, a representation form of a SimRank matrix may be:

$$S = (cP^T S P) \vee I, \quad (2)$$

where I is a unit matrix, P is a first-order transition matrix in a reversal graph $G^T$ of the original graph G=(V,E), and ∨ represents maximum values of corresponding elements of two matrices.

An element $P_{ij}$ of the first-order transition matrix P may be expressed as:

$$P_{ij} = \begin{cases} 1/|In(j)|, & (i, j) \in E \\ 0, & (i, j) \notin E \end{cases}, \quad (3)$$

According to the representation form $S=(cP^TSP) \vee \vee I$ of the SimRank matrix, S may be divided into:

$$S = cP^T SP + D \text{ where}$$

D is a diagonal matrix, and may be referred to as a diagonal correction matrix; and further, S may be divided into:

$$S = D + cP^T DP + c^2 (P^T)^2 DP^2 + \ldots, \quad (4)$$

It can be seen that, a key of calculating a SimRank similarity is to calculate the diagonal correction matrix D. Currently, the diagonal correction matrix D is calculated by using a Gauss-Seidel algorithm (Gauss-Seidel algorithm) method. Each step of calculation depends on a result of a previous step. Consequently, a long time is consumed, and calculation efficiency is low.

Figure 1:
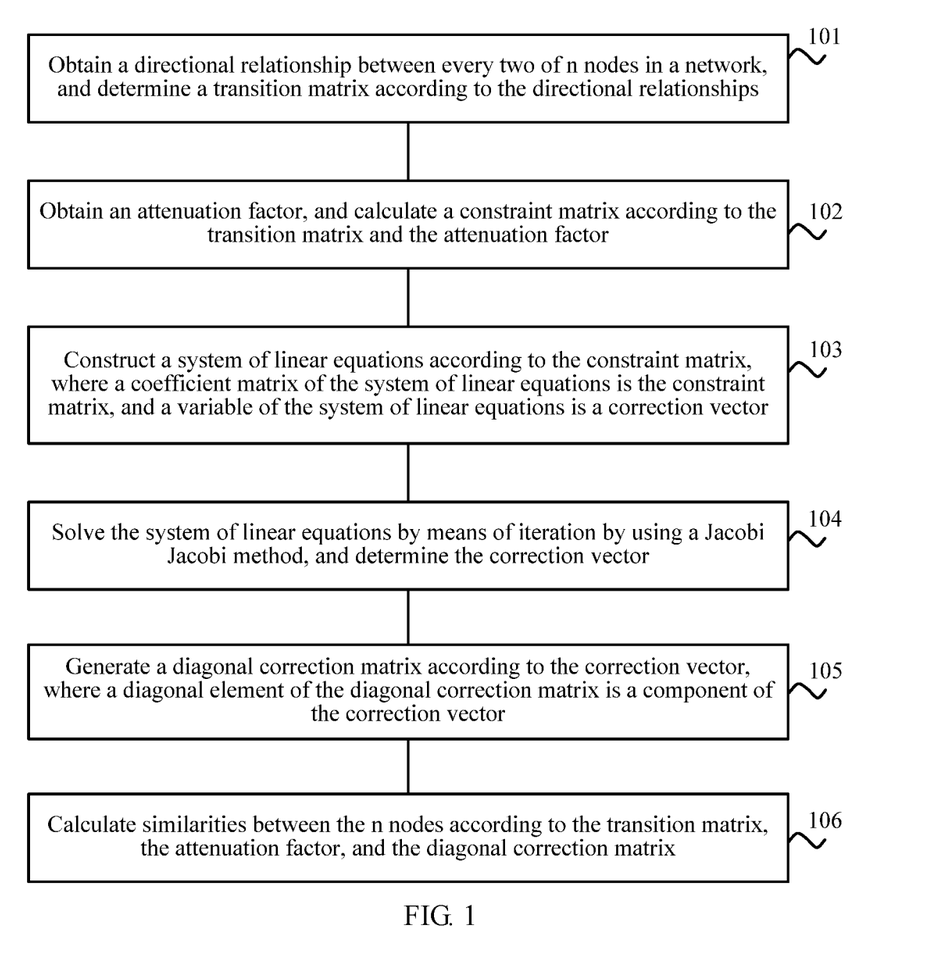
FIG. 1 is a flowchart of a similarity measurement method according to an embodiment of the present application.

FIG. 1 is a flowchart of a similarity measurement method according to an embodiment of the present application. The method shown in FIG. 1 includes the following steps.

101. Obtain a directional relationship between every two of n nodes in a network, and determine a transition matrix according to the directional relationships, where a dimension of the transition matrix is n×n, and n is a positive integer greater than or equal to 2.

102. Obtain an attenuation factor, and calculate a constraint matrix according to the transition matrix and the attenuation factor, where the attenuation factor is an attenuation factor defined in a SimRank similarity method, and a dimension of the constraint matrix is n×n.

103. Construct a system of linear equations according to the constraint matrix, where a coefficient matrix of the system of linear equations is the constraint matrix, and a variable of the system of linear equations is a correction vector.

104. Solve the system of linear equations by means of iteration by using a Jacobi Jacobi method, and determine the correction vector.

105. Generate a diagonal correction matrix according to the correction vector, where a diagonal element of the diagonal correction matrix is a component of the correction vector, and a dimension of the diagonal correction matrix is n×n.

106. Calculate similarities between the n nodes according to the transition matrix, the attenuation factor, and the diagonal correction matrix.

In this embodiment of the present application, the correction vector is determined by using the Jacobi method, and further the similarities between the nodes may be calculated. In each time of iteration of the Jacobi method, elements for calculating the correction vector are independent of each other. In this way, concurrent calculation can be performed, so that a calculation time can be effectively reduced by using a computer cluster, time complexity and space complexity during calculation can be reduced, and the similarity measurement method is applicable to a large network.

Generally, there are numerous nodes in a network, and an order of magnitude of n is also relatively high. For example, n may be on the order of millions, or even on the order of hundred millions. For example, a number of users registered with Facebook is greater than 2.2 billion. The users of Facebook compose nodes in a network of Facebook. Therefore, a number n of the nodes is also greater than 2.2 billion.

In this embodiment of the present application, the n nodes in 101 may be all nodes in the network, or may be some nodes in the network. For example, for Facebook, n nodes may be all the registered users whose number is greater than 2.2 billion, or may be approximately one billion of female users, or may be users whose most recent login is in India. This is not limited in the present application.

It should be noted that, a specific scenario of the network is not limited in this embodiment of the present application, and a manner of obtaining the directional relationship between every two of the n nodes in the network is not limited in this embodiment of the present application. For example, directional relationships may be determined according to a mutual following relationship between the n nodes, or directional relationships may be determined according to call records between the n nodes.

For example, the network in this embodiment of the present application may be a social network (social network), and a node in the network may be used to represent a user in the social network. Therefore, the directional relationship between every two of the nodes may be a following relationship between every two users in the social network.

For example, relatively common social networks include MicroBlog (Weibo or MicroBlog), WeChat (WeChat), EasyChat, MiTalk (MiTalk), Facebook (Facebook), Twitter (Twitter), and LinkedIn (LinkedIn). Therefore, in a social network such as MicroBlog, if a user U1 is a follower of a user U2, it can be construed as that there is a directional relationship from the user U1 to the user U2. In a social network such as WeChat, if a user U1 is a follower of a user U2, and certainly the user U2 is also a follower of the user U1, it can be construed as that there is a directional relationship from the user U1 to the user U2, and there is also a directional relationship from the user U2 to the user U1.

For another example, the network in this embodiment of the present application may be a communications network (such as Huawei chum), and a node in the network may be used to represent a user in the communications network. Therefore, the directional relationship between every two of the nodes may be a call relationship between every two users in the communications network.

For example, if a user U1 ever called a user U2, it can be construed as that there is a directional relationship from the user U1 to the user U2.

It can be seen that, in this embodiment of the present application, the directional relationship is directional. For example, a directional relationship between a node N1 and a node N2 may be: The node N1 is directed to the node N2; or the node N2 is directed to the node N1; or the node N1 is directed to the node N2, and the node N2 is directed to the node N1.

Optionally, 101 may include: constructing a graph (Graph) according to the directional relationship between every two of the n nodes in the network, and using a first-order transition matrix in a reversal graph of the graph as the transition matrix. The n nodes compose nodes in the graph, and the directional relationship composes a directed edge between the nodes in the graph.

It can be understood that the constructed graph is a directed graph. The first-order transition matrix in the reversal graph of the graph is related to a number of nodes directed to each node in the graph. Herein, a number of directed edges directed to each node may be determined, and further the transition matrix is calculated according to the number of directed edges directed to each node.

Figure 2:
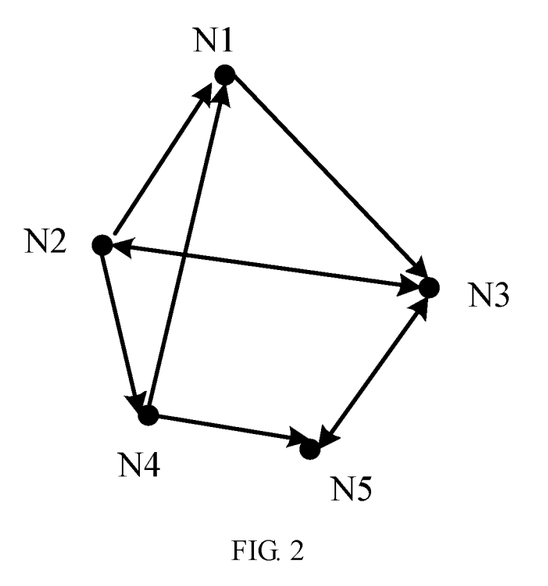
FIG. 2 is a schematic diagram of a "graph" according to an embodiment of the present application.

For example, in a "graph" shown in FIG. 2, five nodes are included, and are respectively N1, N2, N3, N4, and N5, and the graph further includes directed edges between the nodes. Therefore, it can be easily determined that a number of nodes directed to the node N1 is 2; a number of nodes directed to the node N2 is 1; a number of nodes directed to the node N3 is 3; a number of nodes directed to the node N4 is 1; and a number of nodes directed to the node N5 is 2.

It should be noted that, for a specific description of the graph (Graph), refer to a related definition and description in the graph theory in the prior art. To avoid repetition, details are not described herein.

Specifically, in this embodiment of the present application, the transition matrix is represented by P, the attenuation factor is represented by c, the constraint matrix is represented by A, the correction vector is represented by x, the diagonal correction matrix is represented by D, and the similarities between the nodes are represented by S.

In addition, the dimension of the transition matrix P is n×n, the dimension of the constraint matrix A is n×n, the dimension of the diagonal correction matrix D is n×n, a dimension of the similarities S between the nodes is n×n, and a dimension of the correction vector x is n, where n is a positive integer.

Correspondingly, $P_{ij}$ represents an element in an $i^{th}$ row and in a $j^{th}$ column of the transition matrix P, $a_{ij}$ represents an element in an $i^{th}$ row and in a $j^{th}$ column of the constraint matrix A, $x_i$ represents an $i^{th}$ element of the correction vector x, and $D_{ij}$ represents an element in an $i^{th}$ row and in a $j^{th}$ column of the diagonal correction matrix D, where i, j=1, 2, ..., n.

In this embodiment of the present application, the transition matrix P is a first-order transition matrix in a reversal graph $G^T$ of an original graph G=(V,E), and 101 may be determined by using the following formula:

$$P_{ij} = \begin{cases} 1/|\text{In}(j)|, & (i,j) \in E \\ 0, & (i,j) \notin E \end{cases},$$

where

In(j) represents a set of nodes that are all directed to a node j, V represents a set of nodes in the graph, and E represents a set of node groups in which there is a directional relationship between nodes in the node groups.

A directional relationship between nodes may be determined in a process of constructing a graph. For example, in the foregoing chum analysis of Huawei, a directional relationship between nodes may be constructed according to a call record between customers. It is assumed that a customer A corresponds to a node A in a graph, and a customer B corresponds to a node B in the graph. Therefore, if the customer A ever called the customer B, a directed edge directed from the node A to the node B may be established during construction of the graph. That is, the node A is directed to the node B.

In this embodiment of the present application, 104 may include: calculating a system of linear equations Ax=b by using the Jacobi method, where b is a vector whose each element is 1. Herein, a variable of the system of linear equations is the correction vector.

Specifically, the correction vector in 104 may be determined by means of iteration based on an initial value of the correction vector. The initial value of the correction vector is an initialized correction vector, which is represented by $x^{(0)}$. 104 may include: solving the system of linear equations by means of iteration by using the Jacobi method, and determining a solution, which is obtained when a convergence condition is met, as the correction vector, or determining a solution, which is obtained when a preset maximum number of times of iteration is reached, as the correction vector.

Specifically, a theoretical analysis process may be described as follows:

Because the attenuation factor $c \in (0,1)$, according to the foregoing formula (4), the similarities S between the nodes may be approximately:

$$S \approx S^t = D + cP^TDP + c^2(P^T)^2DP^2 + \ldots + c^t(P^T)^tDP^t, \quad (5)$$

where t is a positive integer, for example, t=5.

Further, according to the formula (1), a correlation between a node and the node itself is 1, that is, s(i,i)=1; therefore $$1 = e_i^T S e_i = e_i(D + cP^TDP + \ldots + c^t(P^T)^tD P^t)e_i, \quad (6)$$

where $e_i$ is an orthogonal unit vector, and specifically, $$e_i \square e_j = \begin{cases} 1, & i = j \\ 0, & i \neq j \end{cases}$$

is satisfied.

If it is assumed that $x = (D_{11}, D_{22}, \ldots, D_{nn})^T$, the following formula may be obtained based on the formula (6):

$$1 = x^T(e_i \square e_i + cPe_i \square Pe_i + \ldots + c^tP^te_i \square P^te_i), \quad (7)$$

In this way, the diagonal correction matrix D may be calculated by calculating the system of linear equations Ax=b. b=(b$_1$, b$_2$, ..., b$^n$)$^T$, b$_1$=b$_2$=...=b$_n$=1, A is referred to as the constraint matrix, and an element of A may be obtained by using the formula (7):

$$a_{ij}=e_i\Box e_j+cPe_i\Box Pe_j+ \ldots +c^tP^te_i\Box P^te_j, \quad (8)$$

It can be learned from the foregoing analysis that, 102 may include: determining that an element of the constraint matrix A is $a_{ij}=e_i\Box e_j+cPe_i+\ldots+c^tP^te_i\Box P^te_j$, where $e_i$ and $e_j$ are orthogonal unit vectors, and t is a preset positive integer.

Further, in 103, the system of linear equations Ax=b may be constructed by using the constraint matrix A, and further in 104, the system of linear equations Ax=b is solved by means of iteration to obtain the correction vector x.

For example, in 104, the correction vector may be first initialized to obtain the initialized correction vector x$^{(0)}$, and x$^{(0)}$=(x$_1^{(0)}$, x$_2^{(0)}$, ..., x$_n^{(0)}$)$^T$. Then, calculation is performed by means of iteration by using the initialized correction vector x$^{(0)}$.

It should be noted that, a method for initializing the correction vector is not limited in this embodiment of the present application, and a value of the initialized correction vector is not limited either. For example, initialization may be performed by using a random (Random) function. For example, the initialized correction vector may be defined to be equal to 1.

Therefore, 104 may specifically include: calculating the correction vector by using $$x_i^{(k)} = \frac{1}{a_{ii}}\left(b_i - \sum_{j\neq i} a_{ij}x_j^{(k-1)}\right).$$

$x_i$ represents an i$^{th}$ element of the correction vector x, $x_j$ represents a j$^{th}$ element of the correction vector x, $a_{ij}$ represents an element in an i$^{th}$ row and in a j$^{th}$ column of the constraint matrix A, $a_{ii}$ represents an element in the i$^{th}$ row and in an i$^{th}$ column of the constraint matrix A, $b_i$=1, k represents a number of times of iteration of the Jacobi method, i, j=1, 2, ..., n, the dimension of the constraint matrix A is n×n, and k and n are both positive integers.

Optionally, in an embodiment, the correction vector determined in 104 may be a solution obtained after the system of linear equations is convergent.

For example, if $|x_i^{(k)}-x_i^{(k-1)}|<\in$, it is considered that the solution is convergent, so that a value $x_i^{(k)}$ obtained after k$^{th}$ iteration may be used as the solution of the system of linear equations. Herein, $\in$ is a predefined value, for example, $\in=10^{-6}$.

Optionally, in an embodiment, the correction vector determined in 104 may be a value, which is obtained when a preset maximum number of times of iteration is reached, of the system of linear equations.

For example, if it is assumed that the preset maximum number of times of iteration is N, a value $x_i^{(N)}$ that is obtained after N$^{th}$ iteration may be used as the solution of the system of linear equations if the system of linear equations is still not convergent when k=N.

In addition, in a process of performing iteration by using the Jacobi method, it can be seen from $$x_i^{(k)} = \frac{1}{a_{ii}}\left(b_i - \sum_{j\neq i} a_{ij}x_j^{(k-1)}\right)$$

that k$^{th}$ iteration depends on a result of k−1$^{th}$ iteration, but updating of each component of the k$^{th}$ iteration is independent. That is, calculation of $x_i^{(k)}$ is related to $x_j^{(k-1)}$, but is unrelated to $x_j^{(k)}$. In this way, when the k$^{th}$ iteration is performed, calculation of n $x_i^{(k)}$ may be concurrently performed, so that a calculation time can be shortened, and calculation efficiency can be improved.

In addition, concurrent calculation may be independently performed by multiple CPUs, or calculation may be concurrently performed by using a high performance computer cluster. Therefore, a computer cluster resource can be fully used, computer utilization can be improved, and space complexity and time complexity can be reduced.

Further, it can be seen from $$x_i^{(k)} = \frac{1}{a_{ii}}\left(b_i - \sum_{j\neq i} a_{ij}x_j^{(k-1)}\right)$$

that, in 102 in which the constraint matrix A is calculated, only each row of the constraint matrix A needs to be calculated online each time instead of explicitly constructing the entire constraint matrix A.

That is, in this embodiment of the present application, 102, 103, and 104 may be concurrently performed. For example, the first row of the constraint matrix A may be first calculated in 102. Then, a linear equation is constructed in 103 by using the first row of the constraint matrix A, and the linear equation is calculated in 104. In addition, the second row, ..., and the like of the constraint matrix A may be calculated in 102 during calculation in 103 and 104.

Further, 105 may include: determining that an element $D_{ij}$ of the diagonal correction matrix D is:

$$D_{ij} = \begin{cases} x_i, & i = j \\ 0, & i \neq j \end{cases},$$

where $D_{ij}$ represents an element in an i$^{th}$ row and in a j$^{th}$ column of the diagonal correction matrix D, and $x_i$ represents the i$^{th}$ element of the correction vector x, where i, j=1, 2, ..., n the dimension of the diagonal correction matrix D is n×n, and n is a positive integer.

That is, the diagonal correction matrix D is:

$$D = \begin{bmatrix} x_1 & & & \\ & x_2 & 0 & \\ & 0 & \ddots & \\ & & & x_n \end{bmatrix}.$$

In this way, in this embodiment of the present application, the diagonal correction matrix D is obtained through calculation by using the Jacobi method, and further the similarities between the nodes may be obtained through calculation by using the formula (5). That is, 106 may include: calculating the similarities between the nodes according to the following formula:

$$S=D+cP^TDP+c^2(P^T)^2DP^2+\ldots+c^t(P^T)DP^t, \text{ where}$$

T represents transposition, and t is a preset positive integer.

It can be understood that, an element $s_{ij}$ that is in an $i^{th}$ row and in a $j^{th}$ column of the matrix S represents a similarity between an $i^{th}$ node and a $j^{th}$ node. In this way, a similarity between every two of the n nodes may be obtained through calculation. That is, a similarity between every two nodes may be obtained through calculation.

In this embodiment of the present application, a value of t is not limited, for example, t=5, or t=20. It can be understood that, a larger value of t indicates higher calculation precision and higher time costs.

In this embodiment of the present application, a value of the attenuation factor $c \in (0,1)$ may be preset, for example, c=0.6. This is not limited in the present application.

In this embodiment of the present application, it is assumed that an $i^{th}$ node of the n nodes is the node i, and a $j^{th}$ node of the n nodes is the node j. For the given node i and node j, the similarity between the node i and the node j may be implemented by using the following code 1 (algorithm 1), which may be referred to as SinglePairSimRank (i,j):

| Algorithm 1 |
| --- |
| 1: procedure SinglePairSimRank (i, j) |
| 2:    $\alpha \leftarrow 0$, $x \leftarrow e_i$, $y \leftarrow e_j$ |
| 3:    for t = 0,1,...,M−1 do |
| 4:        $\alpha \leftarrow \alpha + c^t x^T D y$, $x \leftarrow Px$, $y \leftarrow Py$ |
| 5:    end for |
| 6:    Report $S_{ij} = \alpha$ |
| 7: end procedure |

For example, for a social network, if only a similarity between a customer A and a customer B is expected to be calculated, calculation may be performed by using the foregoing algorithm 1. In addition, if it is assumed that a number of directed edges in the network is Q, time complexity of SinglePairSimRank is O(MQ), and space complexity of SinglePairSimRank is O(Q).

In this embodiment of the present application, it is assumed that an $i^{th}$ node of the n nodes is the node i. For the given node i, similarities between all other nodes (that is, other n−1 nodes in the n nodes except the node i) and the node i may be calculated. In addition, the calculation may be implemented by using the following code 2 (algorithm 2), which may be referred to as SingleSourceSimRank (i):

| Algorithm 2 |
| --- |
| 1: procedure SingleSourceSimRank (i) |
| 2:    $\vec{\gamma} \leftarrow \vec{0}$, $x \leftarrow e_i$ |
| 3:    for t = 0,1,...,M−1 do |
| 4:        $\gamma \leftarrow \gamma + c^t (P^T)^t Dx$, $x \leftarrow Px$ |
| 5:    end for |
| 6:    Report $S_{ij} = \gamma_j$ for j = 1,2,...,n |
| 7: end procedure |

For example, in a churn analysis of Huawei, if a customer "similar to" a customer A is expected to be determined, calculation may be performed by using the foregoing algorithm 2. In addition, if it is assumed that a number of directed edges in the network is Q, time complexity of SingleSourceSimRank is $O(M^2Q)$, and space complexity of SingleSourceSimRank is O(Q).

In this embodiment of the present application, a similarity between every two of all nodes may be calculated by using the foregoing code 2 (algorithm 2). In addition, the calculation may be implemented by using the following code 3 (algorithm 3), which may be referred to as AllPairsSimRank:

| Algorithm 3 |
| --- |
| 1: procedure AllPairsSimRank |
| 2:    for i = 1,2,...,n do |
| 3:        Compute SingleSourceSimRank (i) |
| 4:    end for |
| 5: end procedure |

For example, in an information recommendation process, similarities between all nodes may be calculated by using the algorithm 3, and further a type of information to be separately recommended to each customer may be determined. In addition, if it is assumed that a number of directed edges in the network is Q, time complexity of AllPairsSimRank is $O(M^2Qn)$, and space complexity of AllPairsSimRank is O(Q).

Figure 3:
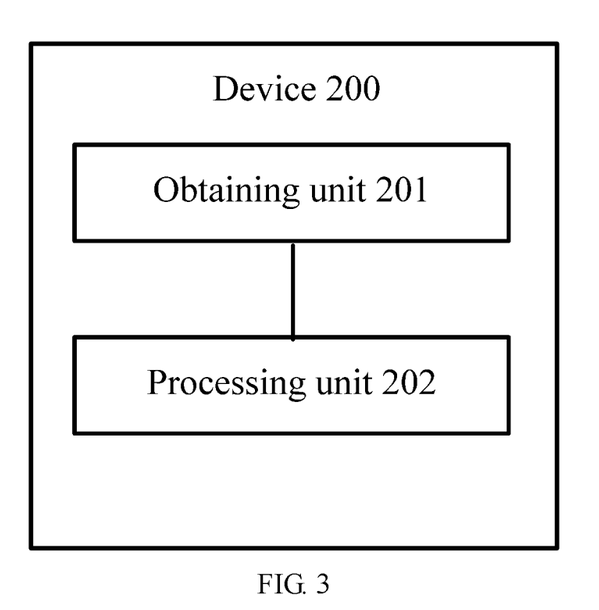
FIG. 3 is a structural block diagram of a similarity measurement device according to an embodiment of the present application.

FIG. 3 is a structural block diagram of a similarity measurement device according to an embodiment of the present application. The device 200 shown in FIG. 3 includes an obtaining unit 201 and a processing unit 202.

The obtaining unit 201 is configured to: obtain a directional relationship between every two of n nodes in a network, and obtain an attenuation factor, where the attenuation factor is an attenuation factor defined in a SimRank similarity method, and n is a positive integer greater than or equal to 2.

The processing unit 202 is configured to: determine a transition matrix according to the directional relationships obtained by the obtaining unit 201, and calculate a constraint matrix according to the transition matrix and the attenuation factor that is obtained by the obtaining unit 201, where a dimension of the transition matrix is n×n, and a dimension of the constraint matrix is n×n.

The processing unit 202 is further configured to construct a system of linear equations according to the constraint matrix, where a coefficient matrix of the system of linear equations is the constraint matrix, and a variable of the system of linear equations is a correction vector.

The processing unit 202 is further configured to: solve the system of linear equations by means of iteration by using a Jacobi Jacobi method, and determine the correction vector.

The processing unit 202 is further configured to generate a diagonal correction matrix according to the correction vector, where a diagonal element of the diagonal correction matrix is a component of the correction vector, and a dimension of the diagonal correction matrix is n×n.

The processing unit 202 is further configured to calculate similarities between the n nodes according to the transition matrix, the diagonal correction matrix, and the attenuation factor that is obtained by the obtaining unit 201.

In this embodiment of the present application, the correction vector is determined by using the Jacobi method, and further the similarities between the nodes may be calculated. In each time of iteration of the Jacobi method, elements for calculating the correction vector are independent of each other. In this way, concurrent calculation can be performed, so that a calculation time can be effectively reduced by using a computer cluster, time complexity and space complexity during calculation can be reduced, and the similarity measurement device is applicable to a large network.

Specifically, in this embodiment of the present application, the transition matrix is represented by P, the attenuation factor is represented by c, the constraint matrix is represented by A, the correction vector is represented by x, the diagonal correction matrix is represented by D, and the similarities between the nodes are represented by S.

In addition, the dimension of the transition matrix P is n×n, the dimension of the constraint matrix A is n×n, the dimension of the diagonal correction matrix D is n×n, a dimension of the similarities S between the nodes is n×n, and a dimension of the correction vector x is n, where n is a positive integer, and n is related to a number of nodes.

Correspondingly, $P_{ij}$ represents an element in an $i^{th}$ row and in a $j^{th}$ column of the transition matrix P, $a_{ij}$ represents an element in an $i^{th}$ row and in a $j^{th}$ column of the constraint matrix A, $x_i$ represents an $i^{th}$ element of the correction vector x, and $D_{ij}$ represents an element in an $i^{th}$ row and in a $j^{th}$ column of the diagonal correction matrix D, where i, j=1, 2, ..., n.

Optionally, in an embodiment, the constraint matrix is represented by A, the correction vector is represented by x, and the system of linear equations is represented by Ax=b. The processing unit 202 is specifically configured to calculate the system of linear equations Ax=b by using the Jacobi method, where b is a vector whose each element is 1.

Specifically, the correction vector may be first initialized to obtain $x^{(0)}$, and further the system of linear equations Ax=b is solved by means of iteration.

When the processing unit 202 solves the system of linear equations by means of iteration by using the Jacobi method, and determines the correction vector, the processing unit 202 is specifically configured to: solve the system of linear equations by means of iteration by using the Jacobi method, and determine a solution, which is obtained when a convergence condition is met, as the correction vector, or determine a solution, which is obtained when a preset maximum number of times of iteration is reached, as the correction vector.

Optionally, in another embodiment, the processing unit 202 is specifically configured to: calculate the correction vector by using $$x_i^{(k)} = \frac{1}{a_{ii}}\left(b_i - \sum_{j \neq i} a_{ij} x_j^{(k-1)}\right).$$

represents an $i^{th}$ element of the correction vector x, $x_j$ represents a $j^{th}$ element of the correction vector x, $a_{ij}$ represents an element in an $i^{th}$ row and in a $j^{th}$ column of the constraint matrix A, $a_{ij}$ represents an element in the $i^{th}$ row and in an $i^{th}$ column of the constraint matrix A, $b_i=1$, k represents a number of times of iteration of the Jacobi method, i, j=1, 2, ..., n, the dimension of the constraint matrix A is n×n, and k and n are both positive integers.

Optionally, in another embodiment, the attenuation factor is represented by c, the transition matrix is represented by P, the constraint matrix is represented by A, and the processing unit 202 is specifically configured to determine that an element of the constraint matrix A is $a_{ij}=e_i\Box e_j + cPe_i\Box Pe_j + \ldots + c^t P^t e_i \Box P^t e_j$. $e_i$ and $e_j$ are orthogonal unit vectors, and t is a preset positive integer.

Optionally, in another embodiment, the correction vector is represented by x, the diagonal correction matrix is represented by D, and the processing unit 202 is specifically configured to determine that an element $D_{ij}$ of the diagonal correction matrix D is $$D_{ij} = \begin{cases} x_i, & i = j \\ 0, & i \neq j \end{cases}.$$

$D_{ij}$ represents an element in an $i^{th}$ row and in a $j^{th}$ column of the diagonal correction matrix D, and $x_i$ represents the $i^{th}$ element of the correction vector x, where i, j=1, 2, ..., n the dimension of the diagonal correction matrix D is n×n, and n is a positive integer.

Optionally, in another embodiment, the attenuation factor is represented by c, the transition matrix is represented by P, the diagonal correction matrix is represented by D, the similarities between the nodes are represented by S, and the processing unit 202 is specifically configured to calculate the similarities between the nodes according to the following formula:

$$S = D + cP^T DP + c^2(P^T)^2 DP^2 + \ldots + c^t(P^T)^t DP^t,$$

where T represents transposition, t is a preset positive integer, and an element $s_{ij}$ that is in an $i^{th}$ row and in a $j^{th}$ column of a matrix represented by S represents a similarity between an $i^{th}$ node and a $j^{th}$ node.

Optionally, in another embodiment, after the obtaining unit 201 obtains the directional relationship, the processing unit 202 is specifically configured to: construct a graph according to the directional relationship that is between every two of the n nodes in the network and that is obtained by the obtaining unit 201, where the n nodes compose n nodes in the graph, and the directional relationship composes a directed edge between the nodes in the graph; and use a first-order transition matrix in a reversal graph of the graph as the transition matrix.

Optionally, in another embodiment, the transition matrix is represented by P, and $$P_{ij} = \begin{cases} 1/|In(j)|, & (i,j) \in E \\ 0, & (i,j) \notin E \end{cases},$$

where $P_{ij}$ represents an element in an $i^{th}$ row and in a $j^{th}$ column of the transition matrix P, In(j) represents a set of nodes that are all directed to a node j, and E represents a set of node groups in which there is a directional relationship between nodes in the node groups.

Optionally, in this embodiment of the present application, the device 200 may be a server configured to process data. For example, the device 200 may be a server of a social network.

The device 200 can be configured to implement the method in the embodiment of FIG. 1. To avoid repetition, details are not described herein again.

Figure 4:
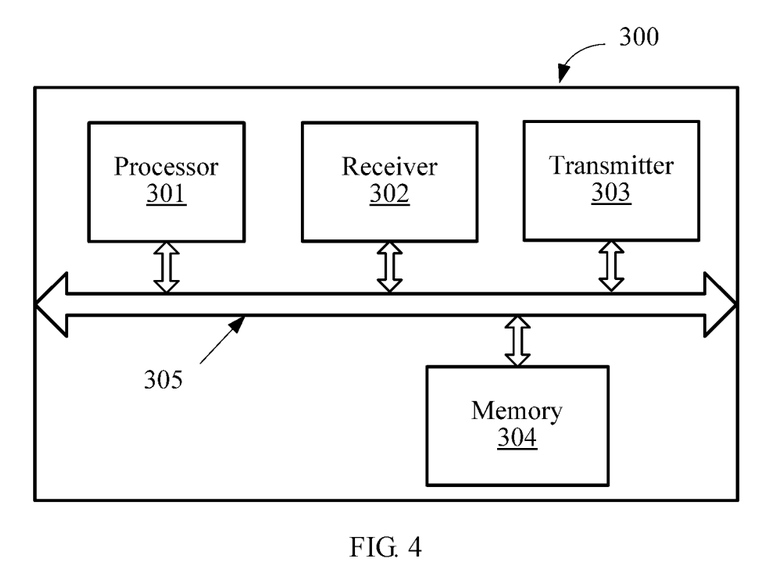
FIG. 4 is a structural block diagram of a similarity measurement device according to another embodiment of the present application.

FIG. 4 is a structural block diagram of a similarity measurement device according to another embodiment of the present application. The device 300 shown in FIG. 4 includes a processor 301, a receiver 302, a transmitter 303, and a memory 304.

The receiver 302 is configured to: obtain a directional relationship between every two of n nodes in a network, and obtain an attenuation factor, where the attenuation factor is an attenuation factor defined in a SimRank similarity method, and n is a positive integer greater than or equal to 2.

The processor 301 is configured to: determine a transition matrix according to the directional relationships obtained by the receiver 302, and calculate a constraint matrix according to the transition matrix and the attenuation factor that is obtained by the receiver 302, where a dimension of the transition matrix is n×n, and a dimension of the constraint matrix is n×n.

The processor 301 is further configured to construct a system of linear equations according to the constraint matrix, where a coefficient matrix of the system of linear equations is the constraint matrix, and a variable of the system of linear equations is a correction vector.

The processor 301 is further configured to: solve the system of linear equations by means of iteration by using a Jacobi Jacobi method, and determine the correction vector.

The processor 301 is further configured to generate a diagonal correction matrix according to the correction vector, where a diagonal element of the diagonal correction matrix is a component of the correction vector, and a dimension of the diagonal correction matrix is n×n.

The processor 301 is further configured to calculate similarities between the n nodes according to the transition matrix, the diagonal correction matrix, and the attenuation factor that is obtained by the receiver 302.

In this embodiment of the present application, the correction vector is determined by using the Jacobi method, and further the similarities between the nodes may be calculated. In each time of iteration of the Jacobi method, elements for calculating the correction vector are independent of each other. In this way, concurrent calculation can be performed, so that a calculation time can be effectively reduced by using a computer cluster, time complexity and space complexity during calculation can be reduced, and the similarity measurement device is applicable to a large network.

Components in the device 300 are coupled by using a bus system 305. The bus system 305 further includes a power supply bus, a control bus, and a status signal bus in addition to a data bus. However, for the purpose of clear description, all buses are marked as the bus system 305 in FIG. 4.

The methods disclosed in the foregoing embodiments of the present application may be applied to the processor 301, or implemented by the processor 301. The processor 301 may be an integrated circuit chip and have a signal processing capability. During implementation, each step of the foregoing methods may be implemented by an integrated logic circuit of hardware in the processor 301 or by an instruction in a software form. The foregoing processor 301 may be a general purpose processor, a Digital Signal Processor (DSP), an a Application Specific Integrated Circuit (ASIC), a Field Programmable Gate Array (FPGA), or another programmable logic device, discrete gate or transistor logic device, or discrete hardware component. The methods, steps, and logical block diagrams disclosed in the embodiments of the present application may be implemented or performed. The general purpose processor may be a microprocessor or the processor may be any conventional processor and the like. Steps of the methods disclosed in the embodiments of the present application may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 304, and the processor 301 reads information in the memory 304 and completes the steps in the foregoing methods in combination with hardware of the processor.

It may be understood that the memory 304 in this embodiment of the present application may be a volatile memory or a nonvolatile memory, or may include a volatile memory and a nonvolatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), and is used as an external cache. RAMs in many forms such as a static random access memory Static RAM (SRAM), a Dynamic RAM (DRAM), a Synchronous DRAM (SDRAM), a Double Data Rate (SDRAM, DDR SDRAM), an Enhanced SDRAM (ESDRAM), a Synchlink DRAM (SLDRAM), and a Direct Rambus RAM (DR RAM) may be used, and this is an example but is not a limitative description. The memory 304 in the system and the method described in this specification is intended to include, but is not limited to, these memories and any other suitable type of memory.

It may be understood that the embodiments described in this specification may be implemented by hardware, software, firmware, middleware, microcode, or a combination thereof. For implementation by hardware, a processing unit may be implemented in one or more Application Specific Integrated Circuits (ASIC), a Digital Signal Processing (DSP), a digital signal processing device (DSP Device, DSPD), a Programmable Logic Device (PLD), a Field-Programmable Gate Array (FPGA), a general purpose processor, a controller, a microcontroller, a microprocessor, and other electronic units configured to perform the functions described in this application, or a combination thereof.

When the embodiments are implemented in software, firmware, middleware, microcode, program code, or a code segment, they may be stored in, for example, a machine-readable medium of a storage component. The code segment may indicate a process, a function, a subprogram, a program, a routine, a subroutine, a module, a software group, a type, or any combination of an instruction, a data structure, and a program statement. The code segment may be coupled to another code segment or a hardware circuit by transferring and/or receiving information, data, an independent variable, a parameter, or memory content. The information, the independent variable, the parameter, the data, or the like may be transferred, forwarded, or sent in any suitable manner such as memory sharing, message transfer, token transfer, or network transmission.

For implementation by software, the technologies in this specification may be implemented by performing the functional modules (for example, a process and a function) in this specification. Software code may be stored in a storage unit and executed by a processor. The storage unit may be implemented inside the processor or outside the processor, and in the latter case, the storage unit may be coupled to the processor by means of communication by using various means known in the art.

Specifically, in this embodiment of the present application, the transition matrix is represented by P, the attenuation factor is represented by c, the constraint matrix is represented by A, the correction vector is represented by x, the diagonal correction matrix is represented by D, and the similarities between the nodes are represented by S.

In addition, the dimension of the transition matrix P is n×n, the dimension of the constraint matrix A is n×n, the dimension of the diagonal correction matrix D is n×n, a dimension of the similarities S between the nodes is n×n, and a dimension of the correction vector x is n, where n is a positive integer, and n is related to a number of nodes.

Correspondingly, $P_{ij}$ represents an element in an $i^{th}$ row and in a $j^{th}$ column of the transition matrix P, $a_{ij}$ represents an element in an $i^{th}$ row and in a $j^{th}$ column of the constraint matrix A, $x_i$ represents an $i^{th}$ element of the correction vector x, and $D_{ij}$ represents an element in an $i^{th}$ row and in a $i^{th}$ column of the diagonal correction matrix D, where i, j=1, 2, . . . , n.

Optionally, in an embodiment, the constraint matrix is represented by A, the correction vector is represented by x, and the system of linear equations is represented by Ax=b. The processor 301 is specifically configured to calculate the system of linear equations Ax=b by using the Jacobi method, where b is a vector whose each element is 1.

Specifically, the correction vector may be first initialized to obtain $x^{(0)}$, and further the system of linear equations Ax=b is solved by means of iteration.

When the processor 301 solves the system of linear equations by means of iteration by using the Jacobi method, and determines the correction vector, the processor 301 is specifically configured to: solve the system of linear equations by means of iteration by using the Jacobi method, and determine a solution, which is obtained when a convergence condition is met, as the correction vector, or determine a solution, which is obtained when a preset maximum number of times of iteration is reached, as the correction vector.

Optionally, in another embodiment, the processor 301 is specifically configured to: calculate the correction vector by using $$x_i^{(k)} = \frac{1}{a_{ii}}\left(b_i - \sum_{j \neq i} a_{ij} x_j^{(k-1)}\right).$$

$x_i$ represents an $i^{th}$ element of the correction vector x, $x_j$ represents a $j^{th}$ element of the correction vector x, $a_{ij}$ represents an element in an $i^{th}$ row and in a $j^{th}$ column of the constraint matrix A, $a_{ij}$ represents an element in the $i^{th}$ row and in an $i^{th}$ column of the constraint matrix A, $b_i$=1, k represents a number of times of iteration of the Jacobi method, i, j=1, 2, . . . , n, the dimension of the constraint matrix A is n×n, and k and n are both positive integers.

Optionally, in another embodiment, the attenuation factor is represented by c, the transition matrix is represented by P, the constraint matrix is represented by A, and the processor 301 is specifically configured to determine that an element of the constraint matrix A is $a_{ij}=e_i\Box e_j+ cPe_i\Box Pe_j+ \ldots +c^t P^t e_i\Box P^t e_j$. $e_i$ and $e_j$ are orthogonal unit vectors, and t is a preset positive integer.

Optionally, in another embodiment, the correction vector is represented by x, the diagonal correction matrix is represented by D, and the processor 301 is specifically configured to determine that an element $D_{ij}$ of the diagonal correction matrix D is $$D_{ij} = \begin{cases} x_i, & i = j \\ 0, & i \neq j \end{cases}.$$

$D_{ij}$ represents an element in an $i^{th}$ row and in a $j^{th}$ column of the diagonal correction matrix D, and $x_i$ represents the $i^{th}$ element of the correction vector x, where i, j=1, 2, . . . , n, the dimension of the diagonal correction matrix D is n×n, and n is a positive integer.

Optionally, in another embodiment, the attenuation factor is represented by c, the transition matrix is represented by P, the diagonal correction matrix is represented by D, the similarities between the nodes are represented by S, and the processor 301 is specifically configured to calculate the similarities between the nodes according to the following formula:

$$S = D + cP^T DP + c^2(P^T)^2 DP^2 + \ldots + c^t(P^T)^t DP^t,$$

where T represents transposition, t is a preset positive integer, and an element $s_{ij}$ that is in an $i^{th}$ row and in a $j^{th}$ column of a matrix represented by S represents a similarity between an $i^{th}$ node and a $j^{th}$ node.

Optionally, in another embodiment, after the receiver 302 obtains the directional relationship, the processor 301 is specifically configured to: construct a graph according to the obtained directional relationship that is between every two of the n nodes in the network, where the n nodes compose n nodes in the graph, and the directional relationship composes a directed edge between the nodes in the graph; and use a first-order transition matrix in a reversal graph of the graph as the transition matrix.

Optionally, in another embodiment, the transition matrix is represented by P, and $$P_{ij} = \begin{cases} 1/|In(j)|, & (i, j) \in E \\ 0, & (i, j) \notin E \end{cases},$$

where $P_{ij}$ represents an element in an $i^{th}$ row and in a $j^{th}$ column of the transition matrix P, In(j) represents a set of nodes that are all directed to a node j, and E represents a set of node groups in which there is a directional relationship between nodes in the node groups.

It can be understood that, in this embodiment of the present application, the transmitter 303 may be configured to output a value of the similarity obtained by the processor 301 through calculation. For example, the value may be output to a display screen of the device 300, or may be output to another device or apparatus connected to the device 300.

It can be understood that, in this embodiment of the present application, the memory 304 may be configured to store a preset value (for example, values of c and t) that is needed for calculation; may be further configured to store code executed by the processor 301 (for example, the algorithm 1, the algorithm 2, and the algorithm 3 in the embodiment shown in FIG. 1); and may be further configured to store an intermediate result in the calculation process.

Optionally, in this embodiment of the present application, the device 300 may be a server configured to process data. For example, the device 300 may be a server of a social network.

The device 300 can be configured to implement the method in the embodiment of FIG. 1. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A similarity measurement method for nodes in a network, the method comprising:
   obtaining, by a device, a directional relationship between every two of n nodes in the network;
   determining, by the device, a transition matrix according to directional relationships obtained, wherein a dimension of the transition matrix is n×n, and n is a positive integer greater than or equal to 2;
   obtaining, by the device, an attenuation factor based on a SimRank similarity method, and calculating, by the device, a constraint matrix according to the transition matrix and the attenuation factor, wherein a dimension of the constraint matrix is n×n;
   generating, by the device, a system of linear equations with a correction vector as a variable according to the constraint matrix;
   performing, by the device, iteration operations to solve the system of linear equations based on a Jacobi method, the system of linear equations to be solved for determining the correction vector;
   generating, by the device, a diagonal correction matrix according to the correction vector, wherein a dimension of the diagonal correction matrix is n×n;
   obtaining, by the device, similarities between the n nodes according to the transition matrix, the attenuation factor, and the diagonal correction matrix; and
   recommending, by the device, information to a target node according to the similarities between or among the n nodes.

2. The method according to claim 1, wherein the system of linear equations is solved for the correction vector based on a convergence condition or a preset maximum number of times of the iteration operations.

3. The method according to claim 1, wherein the constraint matrix is represented by A, the correction vector is represented by x, and the system of linear equations is represented by Ax=b, and wherein b is a vector and wherein each element of the vector b is of a value 1.

4. The method according to claim 3, wherein the correction vector is determined based on relationships $$x_i^{(k)} = \frac{1}{a_{ii}}\left(b_i - \sum_{j \ne i} a_{ij} x_j^{(k-1)}\right),$$

wherein
   $x_i$ represents an $i^{th}$ element of the correction vector x, $x_j$ represents a $j^{th}$ element of the correction vector x, $a_{ij}$ represents an element in an $i^{th}$ row and in a $j^{th}$ column of the constraint matrix A, $a_{ii}$ represents an element in the $i^{th}$ row and in an $i^{th}$ column of the constraint matrix A, $b_i=1$, k represents a number of times of iteration of the Jacobi method, i,j=1,2, . . . , n and k is a positive integer.

5. The method according to claim 1, wherein the attenuation factor is represented by c, the transition matrix is represented by P, the constraint matrix is represented by A, and wherein the constraint matrix is calculated as:

$$a_{ij} = e_i^\prime e_j + c P e_i^\prime P e_j + \ldots + c^t P^t e_i^\prime P^t e_j,$$

wherein $a_{ij}$ is an element of A,
   $e_i$ and $e_j$ are orthogonal unit vectors, and t is a preset positive integer.

6. The method according to claim 1, wherein the correction vector is represented by x, the diagonal correction matrix is represented by D, and wherein the diagonal correction matrix is generated as:

$$D_{ij} = \begin{cases} x_i, & i = j \\ 0, & i \ne j \end{cases},$$

wherein
- $D_{ij}$ represents an element in an $i^{th}$ row and in a $j^{th}$ column of the diagonal correction matrix D, and $x_i$ represents the $i^{th}$ element of the correction vector x, wherein i,j=1, 2, . . . , n.

7. The method according to claim 1, wherein the attenuation factor is represented by c, the transition matrix is represented by P, the diagonal correction matrix is represented by D, the similarities between the nodes are represented by a matrix S, and wherein the similarities are determined as:

$$S=D+cP^TDP+c^2(P^T)^2DP^2+ \ldots +c^t(P^T)^tDP^t,$$

wherein
- T represents transposition, t is a preset positive integer, and an element $S_{ij}$ that is in an $i^{th}$ row and in a $j^{th}$ column of S to represent a similarity between an $i^{th}$ node and a $j^{th}$ node.

8. The method according to claim 1, wherein the transition matrix is determined based on a graph representing the directional relationships in the network, wherein the n nodes of the network correspond to n nodes in the graph, wherein each directional relationship corresponds to a directed edge between two nodes in the graph, and wherein the transition matrix is determined as a first-order transition matrix in a reversal graph of the graph.

9. The method according to claim 8, wherein the transition matrix is represented by P, $$P_{ij} = \begin{cases} 1/|In(j)|, & (i,j) \in E \\ 0, & (i,j) \notin E \end{cases},$$

$P_{ij}$ represents an element in an $i^{th}$ row and in a $j^{th}$ column of the transition matrix P, In(j) represents a set of nodes that are all directed to a node j, and E represents a set of node groups in which there is a directional relationship between nodes in the node groups.

10. A similarity measurement device comprising:
a processor;
a receiver configured to cooperate with the processor to
   obtain a directional relationship between every two of n nodes in a network, and
   obtain an attenuation factor based on a SimRank similarity method, wherein n is a positive integer greater than or equal to 2; and
the processor configured to:
   determine a transition matrix according to the directional relationships obtained by the receiver;
   calculate a constraint matrix according to the transition matrix and the attenuation factor, wherein a dimension of the transition matrix is n×n, and a dimension of the constraint matrix is n×n, generate a system of linear equations with a correction vector as a variable according to the constraint matrix;
   perform iteration operations to solve the system of linear equations based on a Jacobi method, the system of linear equations to be solved for determine the correction vector;
   generate a diagonal correction matrix according to the correction vector, wherein a dimension of the diagonal correction matrix is n×n;
   obtain similarities between the n nodes according to the transition matrix, the diagonal correction matrix, and the attenuation factor; and
   recommend information to a target node according to the similarities between or among the n nodes.

11. The device according to claim 10, wherein the system of linear equations is solved for the correction vector based on a convergence condition or a preset maximum number of times of the iteration operations.

12. The device according to claim 10, wherein the constraint matrix is represented by A, the correction vector is represented by x, the system of linear equations is represented by Ax=b, and b is a vector and each element of the vector b is of a value 1.

13. The device according to claim 12, wherein the correction vector is obtained based on relationships:

$$x_i^{(k)} = \frac{1}{a_{ii}}\left(b_i - \sum_{j \neq i} a_{ij} x_j^{(k-1)}\right),$$

wherein
- $x_i$ represents an $i^{th}$ element of the correction vector x, $x_j$ represents a $j^{th}$ element of the correction vector x, $a_{ij}$ represents an element in an $i^{th}$ row and in a $j^{th}$ column of the constraint matrix A, $a_{ii}$ represents an element in the $i^{th}$ row and in an $i^{th}$ column of the constraint matrix A, $b_i=1$, k represents a number of times of iteration of the Jacobi method, i,j=1,2, . . . , n, and k is a positive integer.

14. The device according to claim 10, wherein the attenuation factor is represented by c, the transition matrix is represented by P, the constraint matrix is represented by A, and the constraint matrix is calculated as:

$$a_{ij}=e_i \cdot e_j+cPe_i \cdot Pe_j+ \ldots +c^tP^te_i \cdot P^te_j,$$

wherein $a_{ij}$ is an element of A,
$e_i$ and $e_j$ are orthogonal unit vectors, and t is a preset positive integer.

15. The device according to claim 10, wherein the correction vector is represented by x, the diagonal correction matrix is represented by D, and wherein the diagonal correction matrix is generated as:

$$D_{ij} = \begin{cases} x_i, & i = j \\ 0, & i \neq j \end{cases},$$

wherein
- $D_{ij}$ represents an element in an $i^{th}$ row and in a $j^{th}$ column of the diagonal correction matrix D, and $x_i$ represents the $i^{th}$ element of the correction vector x, wherein i,j=1,2, . . . , n.

16. The device according to claim 10, wherein the attenuation factor is represented by c, the transition matrix is represented by P, the diagonal correction matrix is represented by D, the similarities between the n nodes are represented by a matrix S, and the similarities are determined as:

$$S=D+cP^TDP+c^2(P^T)^2DP^2+ \ldots +c^t(P^T)^tDP^t,$$

wherein
- T represents transposition, t is a preset positive integer, and an element $S_{ij}$ that is in an $i^{th}$ row and in a $j^{th}$ column of S to represent a similarity between an $i^{th}$ node and a $j^{th}$ node.

17. The device according to claim 10, wherein the transition matrix is determined based on a graph representing the directional relationships in the network, wherein the n nodes of the network correspond to n nodes in the graph, wherein each directional relationship corresponds to a directed edge between two nodes in the graph, and wherein the transition matrix is determined as a first-order transition matrix in a reversal graph of the graph as the transition matrix.

18. The device according to claim 17, wherein the transition matrix is represented by P, $$P_{ij} = \begin{cases} 1/|In(j)|, & (i, j) \in E \\ 0, & (i, j) \notin E \end{cases},$$

$P_{ij}$ represents an element in an $i^{th}$ row and in a $j^{th}$ column of the transition matrix P, In(j) represents a set of nodes that are all directed to a node j, and E represents a set of node groups in which there is a directional relationship between nodes in the node groups.

19. A non-transitory computer-readable storage medium for similarity measurement of nodes in a network, comprising instructions which, when executed by a computer, cause the computer to carry out steps:
    obtaining a directional relationship between every two of n nodes in the network;
    determining a transition matrix according to directional relationships obtained, wherein a dimension of the transition matrix is n×n, and n is a positive integer greater than or equal to 2;
    obtaining an attenuation factor based on a SimRank similarity method, and calculating a constraint matrix according to the transition matrix and the attenuation factor, wherein a dimension of the constraint matrix is n×n;
    generating a system of linear equations with a correction vector as a variable according to the constraint matrix;
    performing iteration operations to solve the system of linear equations based on a Jacobi method, the system of linear equations to be solved for determining the correction vector;
    generating, by the device, a diagonal correction matrix according to the correction vector, wherein a dimension of the diagonal correction matrix is n×n;
    obtaining similarities between the n nodes according to the transition matrix, the attenuation factor, and the diagonal correction matrix; and
    recommending, by the device, information to a target node according to the similarities between or among the n nodes.

20. The non-transitory computer-readable storage medium according to claim 19, wherein the system of linear equations is solved for the correction vector based on a convergence condition or a preset maximum number of times of the iteration operations.

* * * * *

UNITED STATES PATENT AND TRADEMARK OFFICE
CERTIFICATE OF CORRECTION

PATENT NO. : 10,579,703 B2  
APPLICATION NO. : 15/694559  
DATED : March 3, 2020  
INVENTOR(S) : Li et al.

Page 1 of 1

It is certified that error appears in the above-identified patent and that said Letters Patent is hereby corrected as shown below:

In the Claims

Claim 7, Column 25, Line 12: "$S = D + c^{PT}DP + c^2(P^T)^2DP^2 + ... + c^t(P^T)^tDP^t$" should read -- $S = D + cP^TDP + c^2(P^T)^2DP^2 + ... + c^t(P^T)^tDP^t$ --.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*